Figure 1:
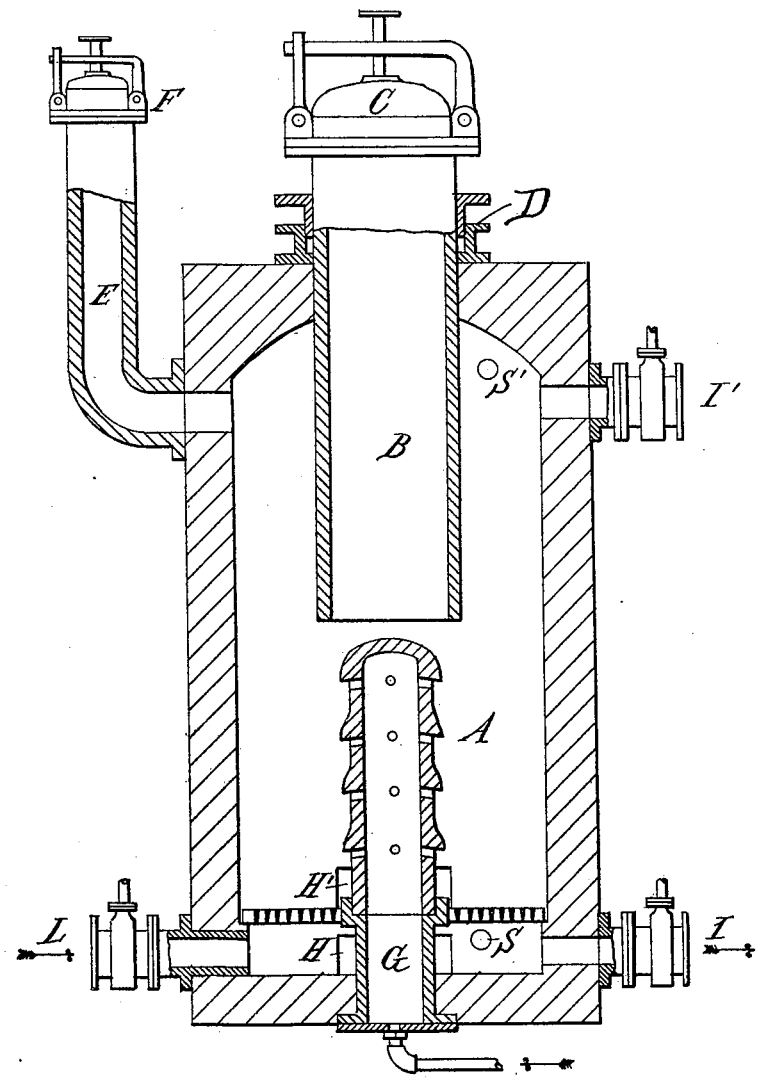

No. 636,899. Patented Nov. 14, 1899.
C. DELLWIK.
PROCESS OF MANUFACTURING WATER GAS.
(Application filed Feb. 13, 1897.)
(No Model.) 4 Sheets—Sheet 1.

No. 636,899. Patented Nov. 14, 1899.
C. DELLWIK.
PROCESS OF MANUFACTURING WATER GAS.
(Application filed Feb. 13, 1897.)
(No Model.) 4 Sheets—Sheet 2.

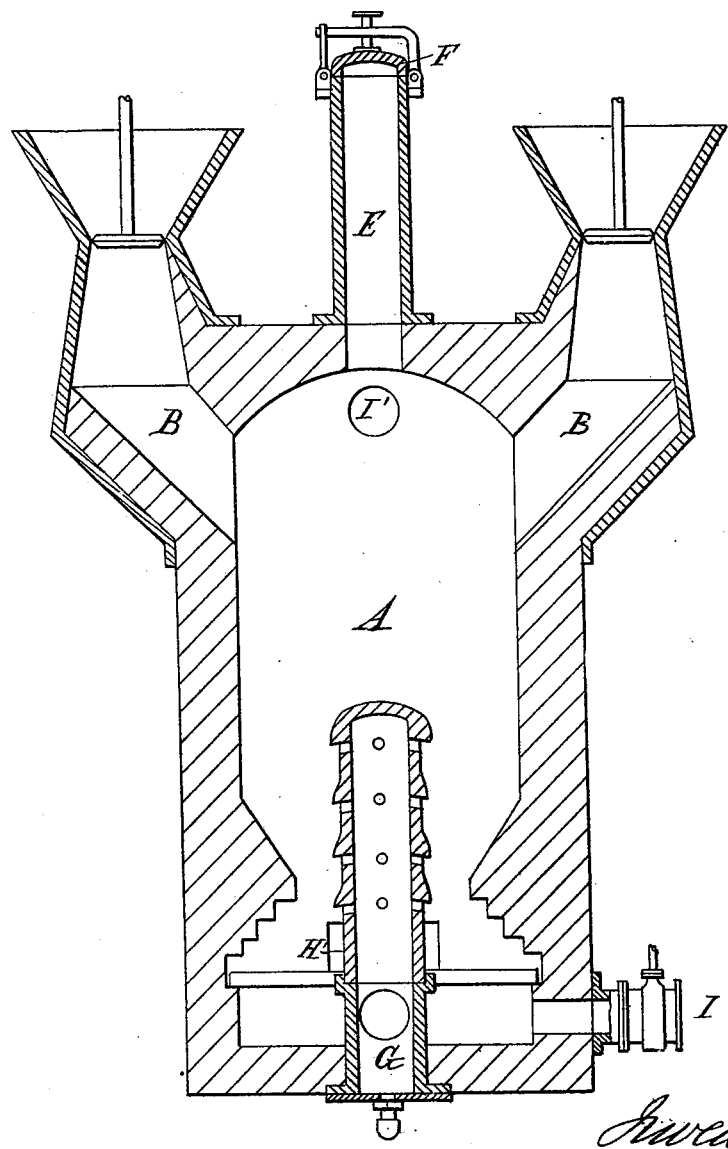

UNITED STATES PATENT OFFICE.

CARL DELLWIK, OF STOCKHOLM, SWEDEN, ASSIGNOR TO JACOB EDUARD GOLDSCHMID, OF FRANKFORT-ON-THE-MAIN, GERMANY.

PROCESS OF MANUFACTURING WATER-GAS.

SPECIFICATION forming part of Letters Patent No. 636,899, dated November 14, 1899.

Application filed February 13, 1897. Serial No. 623,290. (No specimens.)

*To all whom it may concern:*

Be it known that I, CARL DELLWIK, engineer, a subject of the King of Sweden and Norway, residing at 6 Grefgatan, Stockholm, in the Kingdom of Sweden, have invented new and useful Improvements in the Production of Water-Gas, of which the following is a specification.

The present invention (for which I have obtained Letters Patent in Germany, No. 105,511, antedated November 30, 1896; in England, No. 29,863, antedated December 28, 1896; in France, No. 262,589, antedated December 28, 1896; in Austria, No. 47/776, antedated December 28, 1896; in Belgium, No. 125,429, antedated December 30, 1896; in Italy, No. 43,785, antedated February 3, 1897; in Spain, No. 20,279, dated February 23, 1897, and in Hungary, No. 8,979, antedated January 16, 1897) relates to a new process for manufacturing water-gas and to suitable apparatus for the practical application of this process. By "water-gas" is generally understood the gases produced by the decomposition of steam by coals, coke, or other suitable fuel at a white heat and which may be considered as consisting mainly of a mixture of hydrogen and oxid of carbon. In this decomposition a large amount of heat taken from the coal is absorbed. If, therefore, the coals are heated, as is generally the case, by blowing air into furnaces or so-called "generators" and not into specially-heated retorts, then in order to again raise the temperature of the combustible material (coke, coals, or the other fuel) which has fallen in consequence of the decomposition of the steam—that is to say, during the period of the production of gas—it becomes necessary to shut off the admission of steam and to introduce air instead in order to revive the fire. In this manner in the production of water-gas by generators the periods of production of gas (by the introduction of steam) and of the introduction of air to revive the fire constantly alternate.

In the hitherto-known processes for manufacturing water-gas it has been the practice to supply to the coals arranged in layers of great height during the air-supply period such a quantity of air as to cause the coals to burn incompletely and produce oxid of carbon, but not to effect a complete combustion, resulting in the production of carbonic acid, the result being to produce during the air-supply period a combustion product containing (together with free nitrogen) as much carbonic oxid as possible combustible and suitable for heating purposes, or, in other words, to produce so-called "producer-gas." The hitherto-employed processes for the manufacture of water-gas have therefore been characterized by the combustion products obtained during the air-supply period (the so-called "producer-gas") containing more carbonic oxid than carbonic acid. This fact constitutes a distinct demarcation-line, separating the processes hitherto used from the new method, which forms the subject of the present application, and the aim of which, on the contrary, is to obtain during the air-supply period combustion products containing a larger quantity of carbonic acid than of carbonic oxid. These combustion products have consequently no great fuel value and in the new invention are not intended to be used as fuel, the aim of the invention being the following, to wit: Since the heat given out in burning carbon into $CO_2$ is more than three times as great as when burning it into CO, the body of the fuel remaining in the generator receives and retains very much more heat in the first than in the second case, in the proportion of about four to one, and consequently the quantity of water-gas made at the next following stage is very much greater than in the old processes.

The practical advantages of this new process are very great. While hitherto in order to produce water-gas during a period of four or at the utmost six minutes an air-supply period of fifteen to twenty minutes was required to raise the temperature of the fuel to the extent necessary for the decomposition of steam, in the best event the periods were each from seven to twelve minutes. Experiments with the new process have shown an air-supply period of three to four minutes to be sufficient to render possible a gas-production period of twelve to seventeen minutes before a fresh introduction of air becomes necessary. It is well known that carbon when burning so as to form oxid of carbon develops scarcely one-third of the heat capable of being developed if the same quantity of carbon is burned so as to produce carbonic acid.

The object of the present invention is to conduct the process so as to produce during the air-supply period a gas containing as much carbonic acid as possible and as little oxid of carbon as possible, an aim directly opposite to the result of all the various processes hitherto employed. By the new method, therefore, a much greater amount of heat is generated and an adequate saving of fuel effected, the volume of water-gas produced with the same amount of fuel being doubled in consequence, while the time of air-supply period is correspondingly reduced and that of the gas production considerably increased.

The purpose of the present invention is attained by regulating the proportion between the height, volume, and size of coal, coke, or other suitable fuel employed and the amount of air admitted in such a manner as to cause a complete combustion of carbon to carbonic acid. By properly proportioning the air-supply to the height of combustible fuel combustion products are with certainty obtained during the air-supply period which to the absolute or nearly absolute exclusion of carbonic oxid contain only or chiefly carbonic acid besides nitrogen. The exact proportion varies, of course, in accordance with the nature of the combustible material employed and other circumstances and must be determined experimentally in each separate case. For coke of average size, for instance, it has been found that with an air-pressure of two hundred and ten millimeters water under the grate and with sixty millimeters above the layer of coke—that is to say, with a gradient of one hundred and fifty millimeters in the layer of coke—the height of the latter should be about twelve hundred millimeters in order to obtain combustion-gases nearly free from oxid of carbon and containing about twenty per cent. of carbonic acid. Such a height of coke is also sufficient to completely decompose the steam admitted during the period of the production of gas. According to whether it is desired to use the fuel in layers of greater or less height the air-supply is increased (by means of an increase of pressure) or else diminished, so as to produce in each instance during the air-supply period a complete combustion of the fuel to carbonic acid. For this end it is equally practicable to regulate the height of coke or other fuel in accordance with a given pressure of the air supplied so as to make the reverse adjustment—i. e., to proportion the pressure of air in accordance with a given height of coke or other fuel; but in all cases experiments will indicate a certain definite proportion, according to which for a certain pressure of air supplied a certain definite height of coke or other fuel must be maintained.

For the application of the process according to the present invention any water-gas apparatus may be used if only the height of coke is regulated by frequent and regular charging in of fresh fuel, so as to keep it at a certain and approximately constant height, which shall insure complete combustion to carbonic acid according to the pressure of the air supplied. It is, however, preferable to use an apparatus in which the height of coke is maintained constant in an automatic manner. For the determination of the most suitable height corresponding to a given pressure of the air-supply it is advisable to use a device having an adjustable coal-receptacle. Such apparatus is represented in Fig. 1 of the accompanying drawings.

A is the generator, provided with a coal-receptacle B, say of cast-iron. This coal-receptacle passes through a stuffing-box D, placed on the cover or top of the generator. Under the grating are arranged the main air-inlet L and the gas-outlet I and steam-inlet S'. The generator is also provided with cleaning-doors H and H'. In the upper part there is an outlet-pipe E for the combustion products, which pipe is closed during the period of the production of water-gas by the valve or cover F.

I' is an outlet for water-gas, and S is a second steam-inlet.

Figure 2:
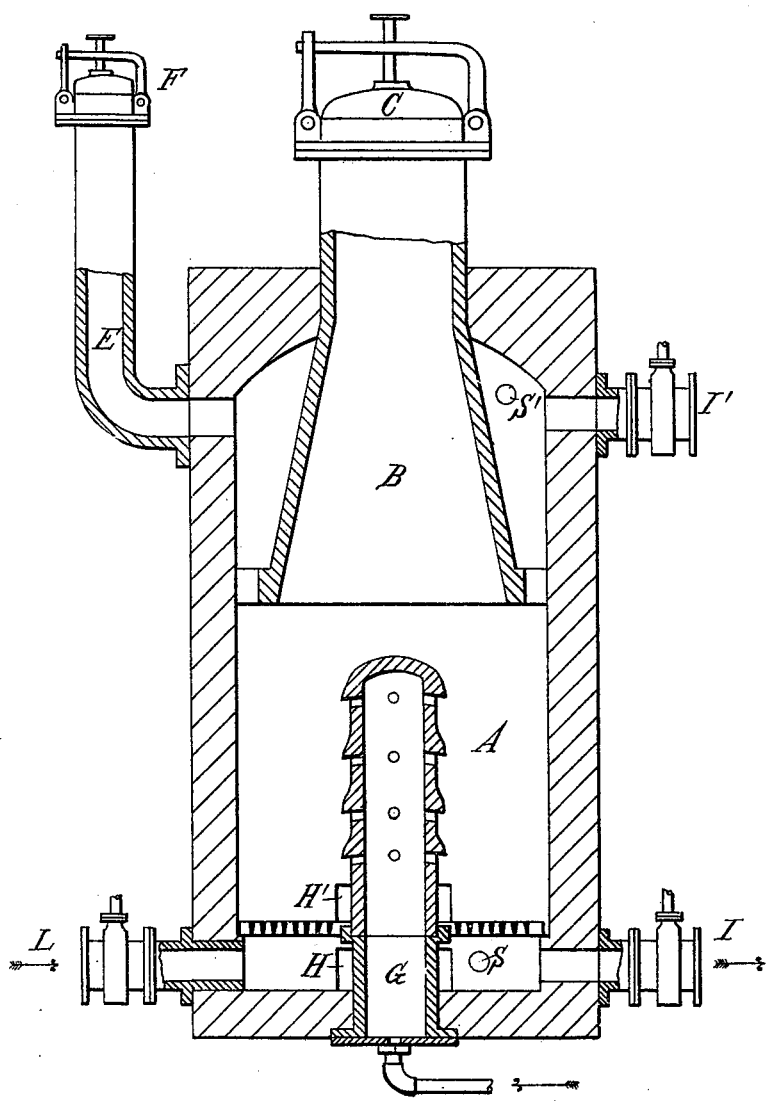

The coal-receptacle B is charged with coal, coke, or other suitable fuel and then closed by the door or cover C. The air-inlet is arranged under the grate, and, if desired, a further quantity of air may be admitted into the layers of fuel by an appropriate pipe G, provided with numerous air nozzles or apertures, although it will of course be understood that said pipe G may be entirely omitted. When the proper height of a given description of fuel for a given amount of air-pressure has been determined by testing by means of the adjustable receptacle B, (shown in Figure 1,) the cast-iron receptacle is advantageously replaced by one made of fire-bricks, as illustrated in Fig. 2.

Figure 3:
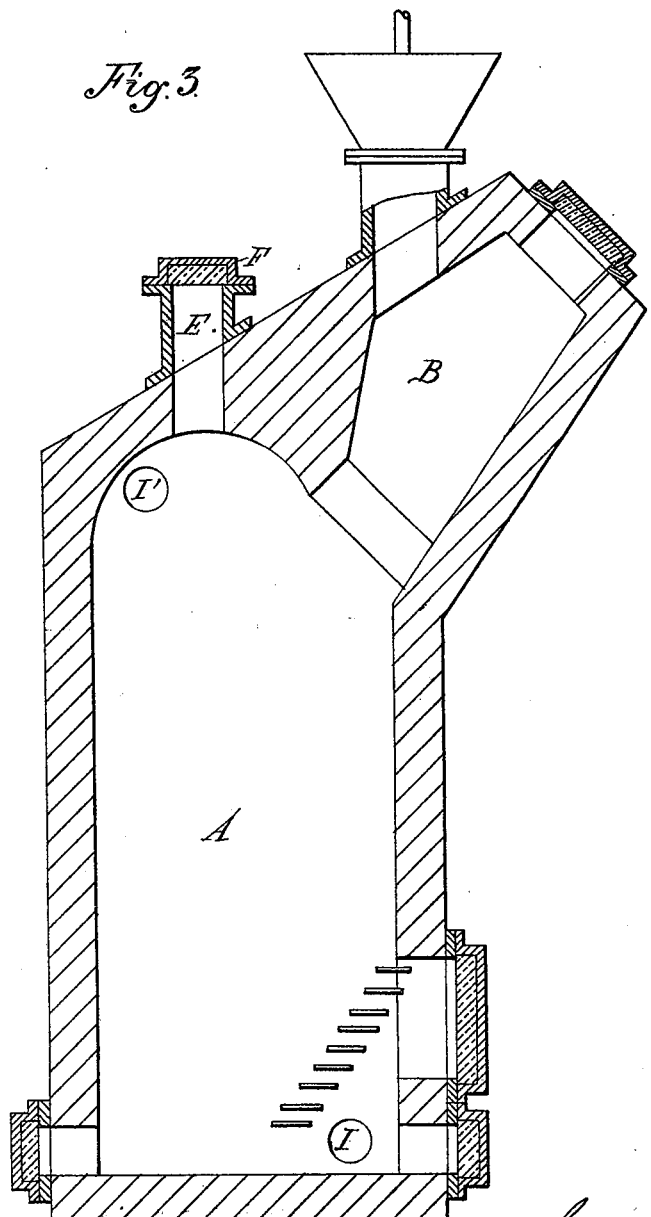

A still simpler method of working according to the present process consists in regulating the pressure of the air-supply in accordance with a given height of fuel maintained at a constant height. In order to keep the fuel constantly at the same level, the apparatus shown in Fig. 3 may be employed, wherein it will be seen that the inclined supply-reservoir B can only supply its contents to the generator as the combustion proceeds.

Fig. 4 shows a construction of a horizontal grating similar to Fig. 1, to which there are provided two supply-reservoirs for fuel. They are shown in the drawings arranged at the sides of the generator, but may equally well be arranged in the generator, as in Fig. 2.

It may also be remarked that it is advisable during the period of the production of gas to admit steam alternately—first, from the top through the pipe S, Figs. 1 and 2, and then from below through the pipe S', and accordingly to discharge or lead off the water-gas first through the pipe I and then through the pipe I'. The result of this will be to keep the temperature as uniform as possible throughout the mass of fuel, and the removal of the slag will be easily effected.

Of course the waste heat during the air-supply period may be also utilized in this process for superheating steam or air, &c., as has been done in the processes hitherto used; but this expedient affords only a partial compensation for the heat commonly expended during the air-supply period, the result of it all being that the heat absorbed by the fuel—i. e., the only heat utilized in the decomposition of steam—during the air-supply period is in the new process four times as great or, if the air is not previously heated in applying the old process, six times as great from each kilogram of coke as in the old processes, which latter during the air-supply period produce, chiefly, carbonic oxid instead of, chiefly, carbonic acid. The great superiority of the present process for the production of water-gas over those hitherto in use is thus clearly demonstrated.

What I claim is—

1. An improvement in the process of making water-gas, which consists in supplying, during the period of heating, to an ignited body of fuel, such quantities of air, proportioned to the height of the fuel, as to prevent the reduction of the carbonic acid generated in the lower layers of the fuel when passing through the upper layers, and to cause a direct combustion of the fuel to carbonic acid throughout all the layers of the fuel, whereby more carbonic acid than carbonic oxid is produced, the air-supply period shortened, the water-gas-generating period lengthened, and the quantity of the generated water-gas increased, substantially as described.

2. An improvement in the process of making water-gas, which consists in supplying to an ignited body of fuel such quantities of air as to prevent the reduction of the carbonic acid generated in lower layers of the fuel when passing through the upper layers, whereby the ratio of carbonic acid to the carbonic oxid is increased, the air-supply period shortened, and the water-gas-generating period lengthened, and fuel economized, substantially as described.

3. An improvement in the process of making water-gas, which consists in supplying to an ignited column of fuel, from one end in axial direction and equally distributed over the entire width of the column, such a current of air as to prevent the reduction of the carbonic acid generated in the lower layers of the fuel when passing through the upper layers, whereby the ratio of the carbonic acid to the carbonic oxid is increased, the air-supply period shortened, and the water-gas-generating period lengthened, and fuel economized, substantially as described.

4. An improvement in the process of making water-gas, which consists in supplying to an ignited column of fuel, from one end in axial direction and equally distributed over the entire width of the column, such a current of air as to prevent the reduction of the carbonic acid generated in the lower layers of the body when passing through the upper layers, and to cause a direct combustion of the fuel to carbonic acid throughout all the layers of the fuel, whereby more carbonic acid than carbonic oxid is produced, the air-supply period shortened, and the water-gas-generating period lengthened.

5. An improvement in the process of making water-gas which consists in increasing the pressure of the air supplied to an ignited body of fuel in such a measure as to prevent the reduction of the carbonic acid generated in the lower layers of the fuel, when passing through the upper layers, whereby the ratio of the carbonic acid to the carbonic oxid is increased, the air-supply period shortened, and the water-gas-generating period lengthened, and fuel economized, substantially as described.

6. An improvement in the process of making water-gas, which consists in increasing the pressure of the air supplied to an ignited body of fuel in such a measure as to prevent the reduction of the carbonic acid generated in the lower layers of the fuel when passing through the upper layers, and to cause direct combustion of the fuel to carbonic acid throughout all the layers of the fuel, whereby more carbonic acid than carbonic oxid is produced, the air-supply period is shortened, and the water-gas-generating period lengthened.

7. An improvement in the process of making water-gas, which consists in first supplying to an ignited column of fuel from one end, in axial direction and equally distributed over the section of the column, air of such pressure as to prevent the reduction of the carbonic acid generated in the lower layers of the fuel when passing through the upper layers, whereby the ratio of the carbonic acid to the carbonic oxid is increased, the air-supply period shortened, and the water-gas-generating period lengthened, and fuel economized, substantially as described.

8. An improvement in the process of making water-gas, which consists in first supplying to an ignited column of fuel, from one end in axial direction and equally distributed over the entire section of the column, air of such pressure as to prevent the reduction of the carbonic acid generated in the lower layers of the fuel when passing through the upper layers, and to cause direct combustion of the fuel to carbonic acid throughout all the layers of the fuel, whereby more carbonic acid than carbonic oxid is produced, the air-supply period shortened, and the water-gas-generating period lengthened.

9. An improvement in the process of making water-gas which consists in supplying during the period of heating to an ignited body of fuel such quantities of air proportioned to the height of the fuel as to prevent the reduction of the carbonic acid generated in the lower layers of the fuel when passing through the upper layers, and to cause a direct combustion of the fuel to carbonic acid throughout all the layers of the fuel, whereby more carbonic acid than carbonic oxid is produced, the air-supply period shortened, the water-gas-generating period lengthened, and the quantity of the generated water-gas increased, and keeping the height of the column of fuel constant, whereby changes of the pressure of the air throughout the whole process are dispensed with; substantially as described.

CARL DELLWIK.

Witnesses:
HEMMING FLODIN,
CARL ERICSSON.